Patented Jan. 17, 1928.

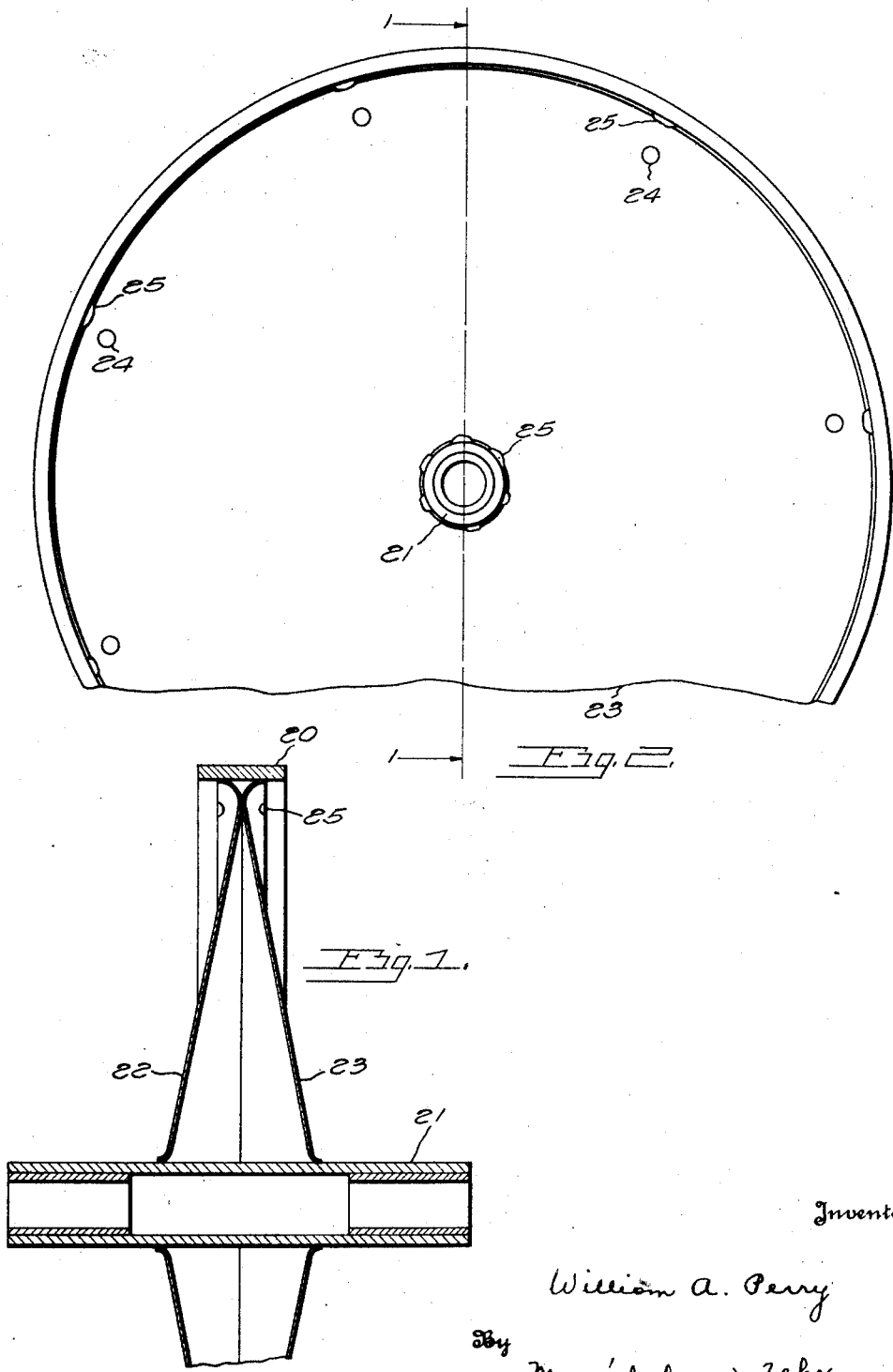

1,656,292

UNITED STATES PATENT OFFICE.

WILLIAM A. PERRY, OF SIDNEY, OHIO.

WHEEL.

Application filed December 1, 1924. Serial No. 753,214.

The present invention relates to wheels and more particularly to wheels of the disk type.

One of the principal objects of the invention is to provide a wheel having a novel construction, combination and arrangement of parts or elements therein, which will be simple, reliable and safe in operation, and which may be conveniently and economically manufactured.

Further objects and advantages of the present invention will be apparent from the following description when taken in connection with the accompanying drawings, in which:

Fig. 1 is a cross section of a portion of the wheel taken on the line 1—1 of Fig. 2; and Fig. 2 is a fragmentary view in side elevation of the wheel.

Referring to the drawing 21 designates the hub which may be of plain tubular or cylindrical form, and 20 designates the rim which may be formed of a simple band or strip of rectangular cross section having its ends welded together to form a rim of suitable strength and rigidity.

The rim portion 20 is supported from the hub 21 and secured thereto by means of a pair of metal disks 22 and 23 which are secured in spaced apart relation upon the outer surface of the hub portion. The disks are complementary and converge towards one another as they recede from the hub and are arranged to abut one another at their outer portions, the abutment of the two disks taking place along a line which is substantially concentric with the hub. From the abutting portions, the disks 22 and 23 flare outwardly and are secured at their outer edges to the inner surface of the rim 20. The disks are preferably rigidly secured together at their abutting portions by spot welding the same together as at 24, although it will be understood that any other suitable means for securing the disks together may be employed.

For rigidly securing the disks 22 and 23 to the hub and to the rim, the disks are provided at their inner and their outer edges with a series of spaced apart notches 25. Connection of the disks with the rim and the hub is preferably effected by welding the disks to the hub and to the rim at the notches 25 by an electric welding process. The notches 25 present relatively long welding edges for welding the disks in place, and because this welding edge is curved and of relatively small extent circumferentially of the wheel, it will be apparent that the heat of welding is confined to a relatively small area as a result of which the heat losses are small and the welding may be accomplished better and more quickly than otherwise. The concentration of the welding edge to a relatively small surface, as described, facilitates the fusing of the parts to be welded and the flow of the welded material, which latter may if desired, be applied in such quantity that it forms a lug which lies in the notch 25 and cooperates therewith to hold the parts together quite irrespective of the fusing or welding between the notches 25 and the said lug.

From the foregoing it will be apparent that the present invention provides a novel disk wheel of extreme simplicity which is sturdy in construction and cheap to manufacture. Although the rim 20 is of a simple band of rectangular form yet it is abundantly reinforced and strengthened by the outer portions of the disks 22 and 23 which are flared and rigidly secured to the rim in such a manner as to form in effect a rim of general T shaped cross section which is light in weight and of great strength. The disks themselves are firmly secured to the hub 21 and to one another at their abutting portions thereby forming a structure having great inherent strength for resisting lateral stresses on the wheel.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A wheel comprising a tubular hub portion, a cylindrical rim portion, a pair of complementary disks positioned between said hub and rim portions to support said hub and rim in spaced relation with each other, said disks being spaced apart adjacent said hub portion and converging towards one another and abutting adjacent the outer portions thereof, on a line substantially concentric with the hub, and means for fastening said disks to the outer surface of said tubular hub portion and to the inner surface of said cylindrical rim portion, said means comprising inner and outer portions of gradual curvature formed on each disk in contact with the hub and rim respectively, the respective portions on the two disks being oppositely curved away from each other, a series of notches formed in the edges of said curved portions of the disks in contact with the hub and rim portions respectively, and welding lugs formed in said notches.

2. A wheel comprising a hub portion, a rim portion, a disk member having portions of gradual curvature at the outer and inner edges thereof interposed between said hub member and said rim member, and means for rigidly securing said disk to said hub member and to said rim member, said means comprising a series of notches formed in the edges of said curved portions of the disk in contact with the hub and rim members respectively, the edges of said notches lying adjacent to the respective surfaces of said members, and welded thereto.

3. A wheel comprising a hub portion, a rim portion, a pair of disks positioned between said hub and rim portions to securely support said rim portion in spaced relation from said hub portion, each of said disks having inner and outer portions of gradual curvature in contact with said hub and rim portions respectively, and means for fastening each of said disks to the hub and rim portions, said means comprising a series of notches formed in the edge of said outer curved portion of each disk in contact with the rim portion, a series of notches formed in the edge of said inner curved portion of each disk in contact with the hub portion, and a welding lug formed in each of said notches to hold the edges of the notches securely to their cooperating members.

4. A wheel of the character described comprising a hub, a disk fastened to said hub, said disk having an outer portion of gradual curvature, a rim in contact with said outer portion of the disk, and means for securing the disk to the rim, said means comprising a series of notches having curved edges provided in the edge of said outer curved portion of the disk at points in contact with the rim, and welding lugs formed in the notches to hold the curved edges of the notches securely to the rim.

5. A wheel of the character described comprising a tubular hub portion, a disk mounted on said hub portion, said disk having an inner portion of gradual curvature in contact with the outer surface of said tubular hub portion, and means for securely attaching said disk to the hub portion, said means comprising a series of notches having curved edges provided in the edge of said inner curved portion of the disk at points in contact with the hub portion, and welding lugs formed in said notches to hold the curved edges of the notches securely to the hub portion.

In testimony whereof I hereto affix my signature.

WILLIAM A. PERRY.